2,189,323

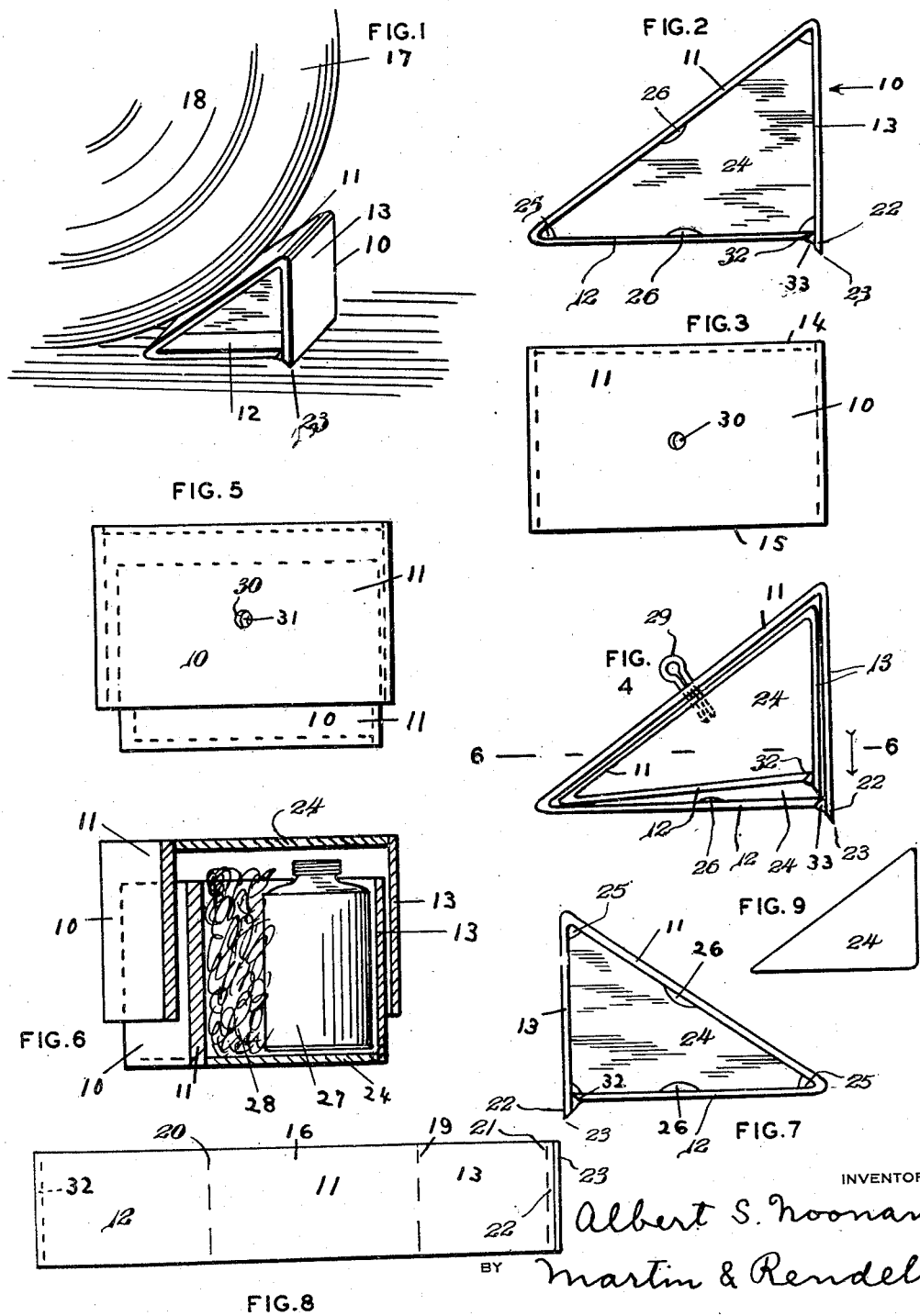
Feb. 6, 1940.  A. S. NOONAN  2,189,323
AUTOMOBILE WHEEL WEDGE
Filed July 7, 1938
INVENTOR
Albert S. Noonan
BY Martin & Rendell
ATTORNEYS Patented Feb. 6, 1940

UNITED STATES PATENT OFFICE 2,189,323

AUTOMOBILE WHEEL WEDGE

Albert S. Noonan, Utica, N. Y.

Application July 7, 1938, Serial No. 217,963

1 Claim. (Cl. 188—32)

This invention relates to wedges to be placed against an automobile tire to prevent the wheels of the automobile from rolling when repairs are being made to the car and particularly when one part of the car has been jacked up to allow a tire to be changed.

When one end or part of an automobile is jacked up for the purpose of changing a tire the brakes under the end or part of the car jacked up cannot be set or at least cannot be kept applied during the whole operation for usually the wheel on which the tire is to be changed has to be rotated from time to time in order to remove the tire and detachable rim from the permanent rim or to remove the tire and more or less of the wheel from the hub or portion of the wheel left on the car. Where the automobile has its tire carried on a rim that is demountable from the main rim upon the wheel, the wheel has to be rotated to get the valve stem at the upper part of the wheel in order to raise the partly removed tire enough to get the valve stem out of its hole through the permanent rim. With most other types of tire it is at least more convenient if not absolutely necessary to be able to rotate the wheels while the tire is being removed and the same tire or another tire replaced on the wheel. In case the car has only two-wheel brakes and a rear tire is to be changed obviously the brakes being upon the rear wheels cannot be used to stop the car from rolling.

The purpose of this invention is to provide an effective and convenient and practicable wedge or set of wedges for blocking the automobile wheels in order to keep the car from rolling when the brakes cannot be used or cannot be used effectively, as when a tire is being changed and one end of the car has been jacked up. When one end of the car has been jacked up and the brakes are not effective the car is very apt to start rolling if it is upon even a very slight incline and rolling at such a time is an element of danger to the person changing the tire. A further purpose of this invention is to provide a blocking wedge which is large enough and strong enough to be effective but which is at the same time light enough and compact enough to be conveniently carried in the modern automobile. A still further purpose is to provide a pair of such wedges which are hollow and can be telescoped so as to be economical of space occupied and to provide the wedges in such a telescopic pair but of hollow formation so that the hollow wedges when telescoped with their open ends opposite to each other will form a convenient receptacle for holding material that is commonly necessary during tire change operations, such as soap and waste for cleaning the hands that get soiled during this operation. A still further purpose is to provide a wedge of the general type above indicated wherein one of the ground engaging faces is provided with a downwardly extending spur which will bite into the surface of the road or ground enough to prevent the wedge from being slid along upon the road even though there be considerable incline in that part of the road. A further purpose is to provide a very light but a very strong wedge of the class indicated but which wedge is very economical in cost of construction by reason of its being made from one strip of sheet metal bent at two points in its length and having its opposite ends attached to each other near their extremities, and with this hollow box reinforced by a triangular piece of sheet metal fitting and permanently fastened within said box.

Further purposes and advantages of the invention will appear from the specification and claim herein:

Fig. 1 is a perspective view of part of an automobile wheel and tire with a wedge embodying this invention applied on the down-hill side of the tire in blocking position.

Fig. 2 is a side elevation on a larger scale of said wheel wedge when seen from its open side and with the wedge in the position it usually occupies when in actual use.

Fig. 3 is a top plan view of the wedge shown in Fig. 2.

Fig. 4 is a side elevation of a cooperating or telescoping pair of wedges embodying this invention when the wedges are telescoped and the smaller wedge is towards the observer.

Fig. 5 is a top plan view of the pair of wedges shown in Fig. 4.

Fig. 6 is a horizontal sectional view taken upon line 6—6 of Fig. 4 and showing the pair of hollow telescoping wedges utilized as a receptacle for holding a can of soap and a bunch of waste.

Fig. 7 is a side elevation of the smaller wedge of Figs. 4 to 6 but with the open side of the wedge towards the observer.

Fig. 8 is a pattern view on a smaller scale of a strip of sheet steel from which the three walls of the hollow box forming the wedge may be made.

Fig. 9 is a pattern view of the triangular plate used to close one triangular side of the wedge.

Referring to the drawing in a more particular description it will be seen that the vehicle or automobile wheel blocking wedge 10 embodying this invention is constructed in the form of a hollow box, triangular in longitudinal section and preferably open at one triangular side. This wedge 10 is accordingly provided with a wall 11 usually used to engage the tire 17 of the automobile wheel 18, a ground engaging wall 12 and a third or upright wall 13. Preferably and most conveniently these three walls will be formed of a relatively stiff metal. Preferably and most conveniently they are formed from a strip 16 of the proper length, width and thickness of open hearth or hot rolled band stock sheet steel of the proper gauge to obtain the desired strength and stiffness without being too heavy for convenient handling and storage. This strip of sheet steel of about the proportion shown in the plan view thereof Fig. 8, is bent at the zones, as 19 and 20, to form the triangular body or hollow open box of the wedge. Preferably the free extremity of the ground engaging wall 12 is fastened as by welding to the zone 21 which is a little back from the free extremity of the upright wall 13 so as to leave a short portion of said upright wall projecting beyond the outer level of the ground engaging wall 12 and this projection forms the spur 22, the downward end or extremity of which is beveled or sharpened to form a strong knife edge 23 adapted to bite into the surface of the road or of the ground against which the bottom or ground engaging wall 12 of the wedge is placed when it is to be in actual use and preventing the wheel from rolling. This operating position of the wedge is plainly shown in Fig. 1 where it has been placed on the down-hill side of the road close to the tire and with the spur adapted to bite into the road as far as necessary to prevent the wedge from being pushed down hill by the weight of the automobile. To this triangular-shaped box open on both of its triangular sides there is attached and rigidly and permanently secured as by welding a stiff plate of metal 24 triangular in general shape as seen in Fig. 9, but having two of its corners rounded slightly so as to fit snugly within said triangular box. By placing this triangular plate just within one open side of the structure described and fastening it there permanently and rigidly a triangular box open on one side is formed which is light in weight but is very stiff and rigid due to the plate 24 forming a reinforcing or stiffening member which added to the general strength of the metal used in the making of the three sides of the box renders the structure well adapted to take the strain incident to being used as a blocking or locking wedge at either side of the wheel of the automobile. Preferably the triangular plate 24 is fastened in its place by welding it at the interior corners of the box as at 25 and at a few spots as 26 intermediate the length of the edges of the triangular plate and the adjoining metal especially of the longest side 11 and of the ground-engaging side 12.

Preferably a pair of these open-sided box-like wedges will be provided for practical use with an automobile inasmuch as in some cases it is advisable to block two wheels on the down-hill side for greater safety and also in some cases a wedging block is placed on both sides of the wheel that is to be blocked while the other part of the automobile is jacked up as for changing the tire or for other necessary repairs. In some cases especially where an automobile has been jacked up it cannot be told with certainty ahead of time which way the automobile may tend to roll when the jack swings either way from its original substantially vertical position.

Preferably and conveniently when these blocking wedges are provided in pairs one wedge will be slightly smaller than the other so as to allow the smaller one to be inserted within the larger one to a greater or less extent and more or less as shown in Figs. 4, 5 and 6. Fig. 4 shows that the smaller blocking wedge is just enough smaller than the large wedge to allow the small one to be conveniently slipped within the larger one. As this smaller wedge as seen in Fig. 4 also has a spur 22 this smaller wedge will have the angle between its longer side and its ground-engaging side slightly less than the corresponding angle of the larger wedge in order as it will be seen from Fig. 4 to allow this telescopic housing of the small wedge in the cavity of the larger one. The slight difference in size of the smaller wedge is not enough to interfere with the effective use of the smaller wedge. This housing of one wedge within the other allows the two wedges to be stored and carried in the automobile in very little more space than will be used for the larger wedge.

Preferably the open side of the smaller wedge will be inserted first into the open side of the larger wedge and the chamber of the small wedge forms a box-like receptacle in which I conveniently place a can 27 of liquid soap such as is commonly used for cleaning the hands after a repair job has been done upon an automobile. In the remaining space of this box there is placed adjacent the can a bunch of waste 28 or a rag for the convenience of the operator in applying the soap and in cleaning the hands from the grease and soap. As shown in Figs. 5 and 6 the larger one of the pair of wedges forms a deep cover protecting the can of soap and the waste that is in the other or smaller wedge from escaping from that wedge and from coming in contact with other things in the tool box or other receptacle of the automobile where the wedges may be carried. Preferably and conveniently the pair of wedges will be detachably fastened in closed telescopic position by a split pin 29 having its two arms projected through aligned holes 30 and 31 in corresponding sides of the pair of wedges. These holes will be in alignment when the wedges are in the desired ordinary substantially completely telescopic position of the two wedges.

As one step in economical manufacture the edge 23 of the projecting spur 22 may be formed by the very step of cutting each successive strip 11 of sheet from the main strip of such metal which is of indefinite length, by having this cutting step so performed as to cut through the metal on the proper acute angle to at the same time form the acute angle of the spur edge. The corresponding bevel 32 left at the other end of the strip does not interfere with the welding of that beveled end of the strip to the vertical side 13 just back from its spur end usually leaving the deposit 33 in the angle of the parts of the proper welding material as will be seen in Figs. 2, 4 and 7.

The corners of the generally triangular box may be sharper or more rounding than shown in the drawing without departing from my invention.

It will be understood that my invention is not limited in the appended claim to the above described details for obviously such a wedge can be made in other ways, such for instance as from one solid piece of flat steel by a blanking process by suitable machines as die presses and then trimmed to the desired height.

What I claim as new and desire to secure by Letters Patent is:

As a new article of automobile equipment, a telescopically housed pair of triangular hollow box-like wedges having one triangular side open, to be used separately as wedges to prevent vehicle wheels from rolling, and forming a closed storage receptacle when the open side of one is introduced telescopically within the open side of the other wedge.

ALBERT S. NOONAN.